United States Patent
Kitahara et al.

(10) Patent No.: US 11,163,635 B2
(45) Date of Patent: Nov. 2, 2021

(54) TRACKING CLUSTER IMAGE MUTATION EVENTS

(71) Applicant: INTERNATIONAL BUSINESS MACHINES CORPORATION, Armonk, NY (US)

(72) Inventors: Hirokuni Kitahara, Tokyo (JP); Yuji Watanabe, Tokyo (JP); Pablo Salvador Loyola Heufemann, Tokyo (JP); Kugamoorthy Gajananan, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 16/578,910

(22) Filed: Sep. 23, 2019

(65) Prior Publication Data
US 2021/0089383 A1     Mar. 25, 2021

(51) Int. Cl.
| G06F 11/00 | (2006.01) |
| G06F 11/07 | (2006.01) |
| G06F 9/54  | (2006.01) |
| G06F 11/30 | (2006.01) |

(52) U.S. Cl.
CPC .......... *G06F 11/0793* (2013.01); *G06F 9/542* (2013.01); *G06F 11/076* (2013.01); *G06F 11/3072* (2013.01)

(58) Field of Classification Search
None
See application file for complete search history.

(56) References Cited

U.S. PATENT DOCUMENTS

| 5,821,908 A      | 10/1998  | Sreenivas |
| 9,842,017 B1 *   | 12/2017  | Zhang ................. G06F 11/3452 |
| 2017/0339178 A1* | 11/2017  | Mahaffey ............. G06F 11/3006 |
| 2018/0075152 A1  | 3/2018   | Zhang |
| 2019/0050560 A1  | 2/2019   | Pereira et al. |
| 2019/0098068 A1  | 3/2019   | Iliofotou et al. |
| 2020/0310890 A1* | 10/2020  | Kedlaya ................ G06F 11/006 |

OTHER PUBLICATIONS

Google Scholar/Patents—text refined (Year: 2020).*
Google Scholar/Patents—text refined (Year: 2021).*
Mell et al. "The NIST Definition of Cloud Computing", NIST Special Publication 800-145, 2011, 7 pages., Sep. 2011.

* cited by examiner

*Primary Examiner* — Christopher S McCarthy
(74) *Attorney, Agent, or Firm* — Tutunjian & Bitetto, P.C.; Randall Bluestone (57) ABSTRACT

Methods and systems for detecting mutation events include collecting change event pattern counts from one or more processing nodes. Unintended change events are identified based on the collected change event pattern counts. A corrective action is performed for the unintended change events.

14 Claims, 7 Drawing Sheets

TRACKING CLUSTER IMAGE MUTATION EVENTS

BACKGROUND

The present invention generally relates to cloud computing systems and, more particularly, to the tracking of unintended changes within image containers.

Platform as a Service (PaaS) systems provide rapidly provisioned computing solutions for diverse workloads on an as-needed basis. Such PaaS systems may have a set of different processing nodes, each of which can be provisioned with a different set of images or "containers" that provide the software needed for workload execution. The PaaS systems may also include a registry system that stores, distributes, and manages those images, sending the images to processing nodes when requested.

During the normal operation of a container, certain operations can cause changes to the contents of the container. When changes occur due to the normal functioning of the container, these intended changes can be safely ignored. However, unintended changes can also be made by external parties, such as a user or an attacker.

SUMMARY

A method for detecting mutation events includes collecting change event pattern counts from one or more processing nodes. Unintended change events are identified based on the collected change event pattern counts. A corrective action is performed for the unintended change events.

A system for detecting mutation events includes a mutation detector configured to collecting change event pattern counts from one or more processing nodes and to identify unintended change events based on the collected change event pattern counts. A controller is configured to perform a corrective action for the unintended change events.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention track unintended changes to a cluster image. To distinguish the unintended changes from the large number of intended changes that occur as part of the container's normal operation, the present embodiments can use change patterns to identify known, intended changes within a container. Using this information, the present embodiments can report and reverse unintended changes. This prevents malicious agents from changing the operation of the system and can maintain runtime integrity for the purposes of regulatory compliance.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
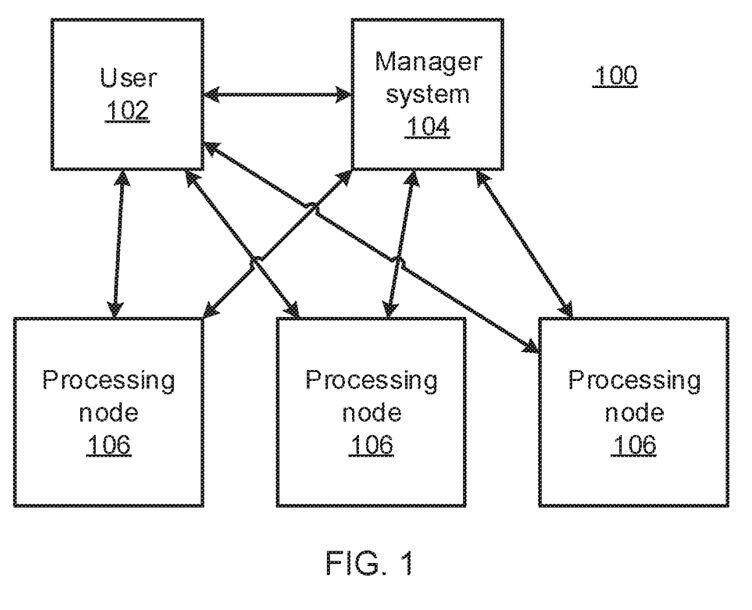
FIG. 1 is a block diagram illustrating a cluster of processing nodes with a manager system that can detect and correct unintended change events in accordance with an embodiment of the present invention.

Referring now to FIG. 1, a diagram of a PaaS system 100 is shown. A user 102 has a workload for execution on a distribution computing platform. The user 102 communicates with a manager system 104 and provides information regarding the workload, including the number and type of processing nodes 106 that will be needed to execute the workload. The information provided to the manager system 104 includes, for example, a number of processing nodes 106, a processor type, an operating system, an execution environment, storage capacity, random access memory capacity, network bandwidth, and any other points that may be needed for the workload. The user 102 can furthermore provide particular images or containers to the manager system 104 for storage in a registry there. It should be understood that the PaaS system 100 can include many thousands of processing nodes 106, each of which can be idle or busy in accordance with the workloads being executed by the PaaS system 100 at any given time. It should also be understood that, although a single manager system 104 is shown, there can be multiple such manager systems 104, with multiple registries distributed across the PaaS system 100. Although the manger system 104 is shown as being a single device, it should be understood that scheduling can be performed at a separate location from the image registry.

Before and during execution of the workload, the manager system 104 determines which processing nodes 106 will use which images. The manager system 104 thus distributes images to the processing nodes 106 according to its own internal logic, for example based on node and resource availability at the time of provisioning. The manager system 104 and the PaaS system 100 can handle multiple different workloads from multiple different users 102, such that the availability of particular resources will depend on what is happening in the PaaS system 100 generally.

Provisioning, as the term is used herein, refers to the process by which resources in a PaaS system 100 are allocated to a user 102 and are prepared for execution. Thus, provisioning includes the determinations made by the manager system 104 as to which processing elements 106 will be used for the workload as well as the transmission of images and any configuration steps that are needed to prepare the processing nodes 106 for execution of the workload.

The processing nodes 106 thus communicate with the manager system 104 to request the images specified by the user 102. After pre-loading, when the manager system 104 makes its final provisioning determinations and selects processing nodes 106 for execution of the user's workload, the nodes 106 will proceed to cure any deficiencies in the prediction, with inaccurately included processing nodes 106 discarding the unneeded image(s) and with inaccurately omitted processing nodes 106 downloading the image(s) from the manager system 104. The processing nodes 106 selected by the manager system 104 then install the images and perform any configuration needed for the workload. Execution can then proceed, triggered by the manager system 104, by the user 102, or by any other appropriate source.

Figure 2:
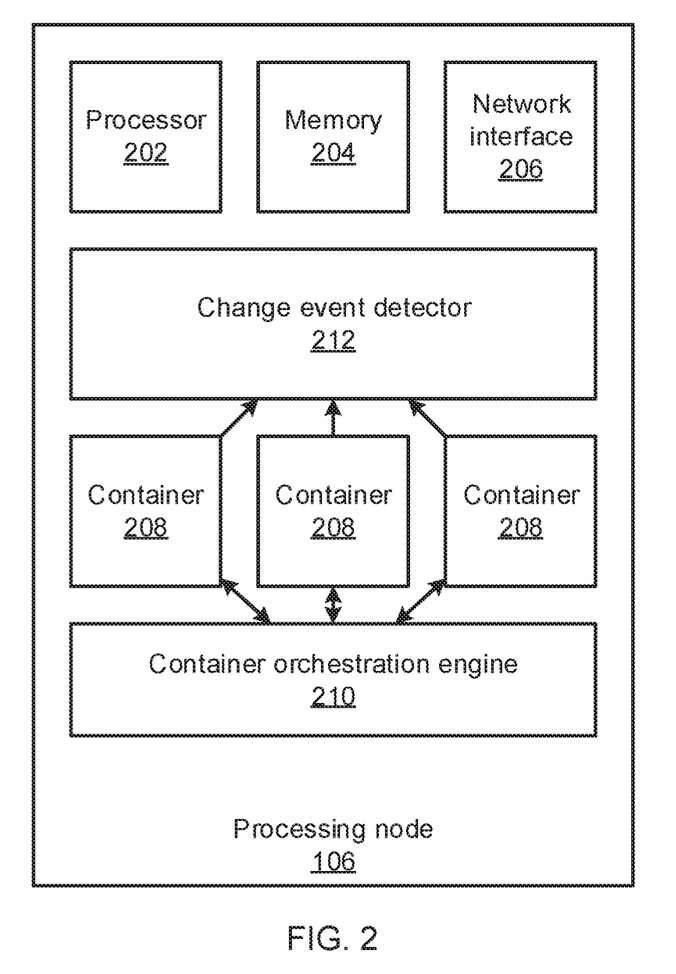
FIG. 2 is a block diagram of a processing node configured to collect change event information and to match it to event patterns in accordance with an embodiment of the present invention.

Referring now to FIG. 2, additional detail on a processing node 106 is shown. The processing node 108 includes a hardware processor 202, a memory 204, and a network interface 206. The network interface 206 is configured to communicate with the user 102 and the manager system 104, and with other processing nodes 106 as needed, using any appropriate communications medium and protocol. The processing node 106 also includes one or more functional modules that may, in some embodiments, be implemented as software that is stored in the memory 204 and that is executed by the hardware processor 202. In other embodiments, one or more of the functional modules may be implemented as one or more discrete hardware components in the form of, e.g., application-specific integrated chips or field programmable gate arrays.

The processing node 106 includes one or more containers 208. It is specifically contemplated that each container 208 represents a distinct operating environment. The containers 208 each include a set of software applications, configuration files, workload datasets, and any other information or software needed to execute a specific workload. The containers 208 are stored in memory 204 and are instantiated and decommissioned by the container orchestration engine as needed. It should be understood that, as a general matter, an operating system of the processing node 106 exists outside the containers 208. Thus, each container 208 interfaces with the same operating system kernel, reducing the overhead needed to execute multiple containers simultaneously. The containers 208 meanwhile generally have no communication with one another outside of specifically agreed-to interfaces, reducing security concerns.

In some embodiments, containers can use an internal storage partition. Containers can also, in some embodiments, access an external distributed filesystem using a container orchestration engine 210 to mount a persistent volume. The container orchestration engine 210 manages the lifecycle of the containers 208, provisioning them, moving them from one processing node 106 to another, performing load balancing, and eventually decommissioning them.

A change event detector 212 receives information from each of the containers 208. There can be many changes that occur, most of which will be intended changes. Unintended changes, also referred to herein as "mutations," can easily get lost among the intended changes if there is no effort made to distinguish between them. Exemplary change events that can occur within a container 208 can include, but are not limited to, file creation, file change, file deletion, and process initialization. In some embodiments, a change to the state of files is not needed, but mutations can include starting a process that, for example, reads a file. In one example of an intended change, a log file for a process may update regularly with normal process status information. In one example of a container mutation, a configuration file could be altered without authorization, causing the container to fail to operate correctly. The recorded change events are forwarded to the manager system 104 via the network interface 206.

Change event detector 212 can use any appropriate mechanism to log change events in the containers 208. For example, changed filenames and executed process commands, along with corresponding process identifiers, can be recorded. This collection of information may not be able to distinguish between intended events and unintended events, and the ratio of intended events to unintended events can be tremendous. For example, in systems that include hundreds of physical processing nodes 106 and thousands of containers 208 between them, there can be millions of intended change events every hour.

The change event detector 212 therefore uses an event pattern list to check for matches between each detected pattern from each of the containers 208. If the event matches a pattern in the list, a counter corresponding to the pattern is incremented. If not, the raw event can be forwarded on to the manager system 104. The pattern counts are also sent to the manager system 104 and reset periodically. The manager system 104 then records received events and extracts patterns from the collected raw events, as will be described in greater detail below. The number of events that are sent to the manager system 104 is thereby drastically reduced, and new events, which have a higher likelihood of being mutations, can be flagged.

Figure 3:
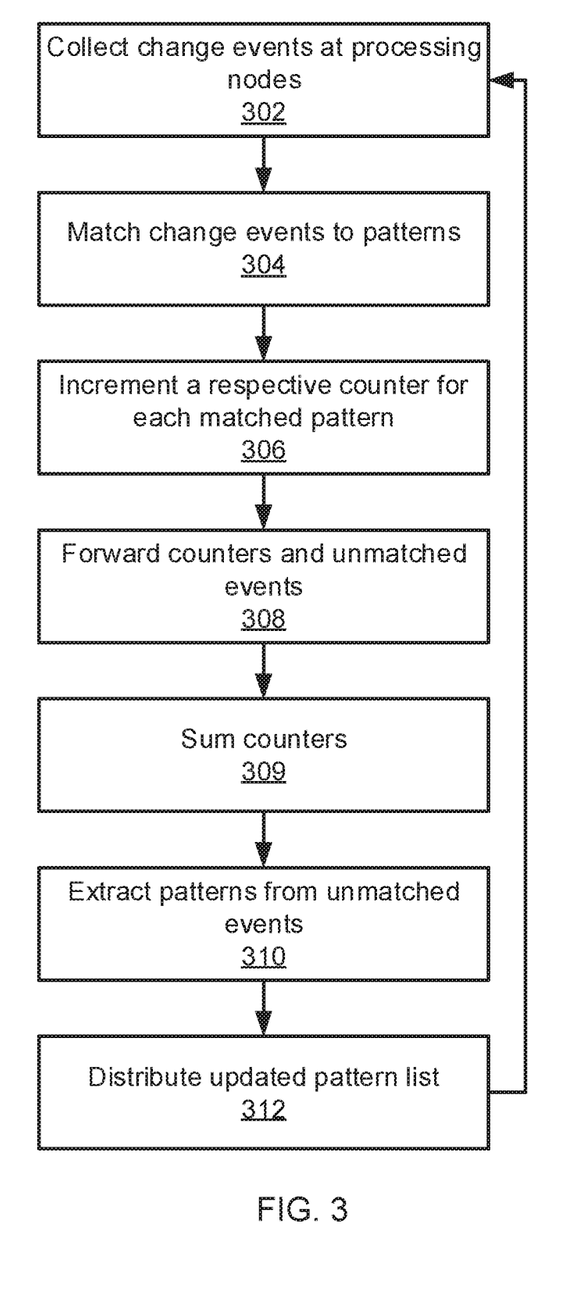
FIG. 3 is a block/flow diagram of a method for detecting change events in accordance with an embodiment of the present invention.

Referring now to FIG. 3, a method of detecting and recording change events in containers is shown. Block 302 collects the change events from all of the containers 208 in a processing node 106. This step is performed across all of the processing nodes 106 in a given system, and all of the change events, including intended changes and unintended changes, are recorded. At each processing node 106, block 304 matches the collected change events to a pattern list. Exemplary patterns can include, for example, identifying identical or similar events that occur within a certain time period and events that occur across similar kinds of containers (e.g., containers based on the same image, same namespace, etc.).

For each matched event, block 306 increments a counter that corresponds to the respective matched pattern. In some embodiments, an event may match multiple different patterns, in which case block 306 can increment multiple respective counters. Block 308 periodically forwards the pattern counts and any unmatched events from the respective processing nodes 106 to the manager system 104.

Block 309 sums the counters for respective patterns, adding new pattern counts to historical pattern counts. These pattern counts accumulate the occurrence of events across an entire cluster, so that a determination can be made as to whether the pattern occurs frequently enough to be an "intended" event. The manager system 104 extracts patterns from the unmatched events in block 310 and adds the newly extracted patterns to the pattern list. Block 312 then distributes the updated pattern list to the processing nodes.

An event pattern can include, for example, a container selector and an attribute matcher. The container selector can specify things like a namespace, a prefix of a pod name, and a container name. An attribute matcher can specify things like a key, an operator, and a value. A tuple of (key, operator, value) can be used to define the condition to check for an event to match with a pattern. Thus, one pattern that matches changes to logs in a particular kind of container might have the format:

namespace: my-namespace
    pod_name: mypod-*
    container_name: myapp
    attributes: ("filename", "match", "/var/log")

Block 310 extracts patterns by finding general patterns that match many intended events. Because intended events are generated by the system and unintended events are generated by a human being, intended events will generally follow a pattern more so than unintended events. Block 310 thus finds similar strings in the same attributes across many changes (e.g., a number of events exceeding a threshold value). These common strings are used to set an initial pattern to match the events. Block 310 can then determine how many change events are covered by the initial pattern. If the number is too large, block 310 strengthens the attribute matcher condition. If the number is too small, the pattern is discarded until a sufficient number of events is reached. Thus, if a condition is made to capture too many events, such that it would also capture unintended events, the condition can be adjusted to be more selective.

Figure 4:
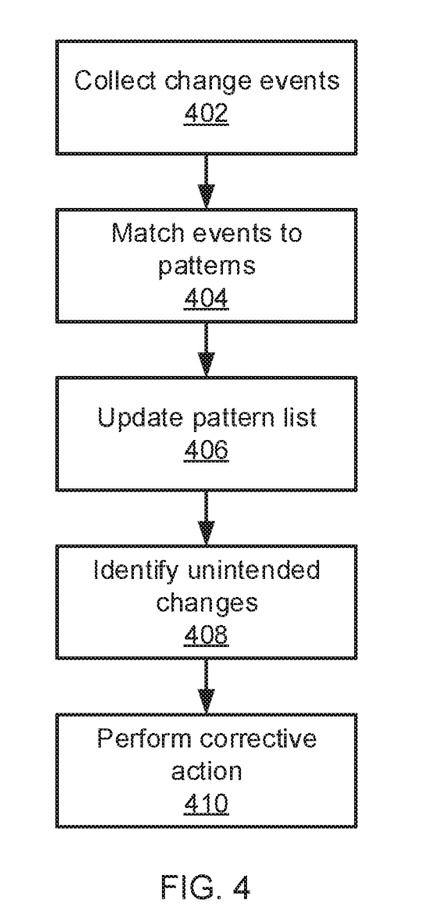
FIG. 4 is a block/flow diagram of a method for detecting and correcting unintended change events in accordance with an embodiment of the present invention.

Referring now to FIG. 4, a method for identifying and correcting unintended changes in containers 208 is shown. Block 402 collects change events, as described above, across all of the containers 208 and all of the processing nodes 106 in a given system. Block 404 matches those events to patterns in a pattern list. By performing the matching locally at the processing nodes 106, the amount of reporting bandwidth that is needed can be greatly reduced, instead transmitting to the manager system 104 only the counts of matched events. Block 406 updates the pattern list, as new patterns of intended changes reach threshold values, and distributes the updated pattern list to the processing nodes 106.

Block 408 identifies unintended changes among the collected change events. In some embodiments, a pattern can be regarded as "intended" when the pattern count reaches a certain threshold number, or reaches a threshold ratio of the pattern count number to a time in operation. Patterns that do not meet this threshold can then be identified as indicating unintended changes.

Block 410 then takes a corrective action. In some embodiments, the corrective action can be as simple as notifying an administrator regarding the unintended changes. This alert can be particularly useful to maintain runtime integrity of the system in accordance with regulatory compliance needs. In some embodiments, the corrective action can include reversing or correcting the change. In yet other embodiments, the corrective action can include a change to the status of a processing node 106 or a container 208 to limit external access to its operations. Such a status change can include, for example, changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. In some cases, the corrective action can include stopping and reinitializing a container 208.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
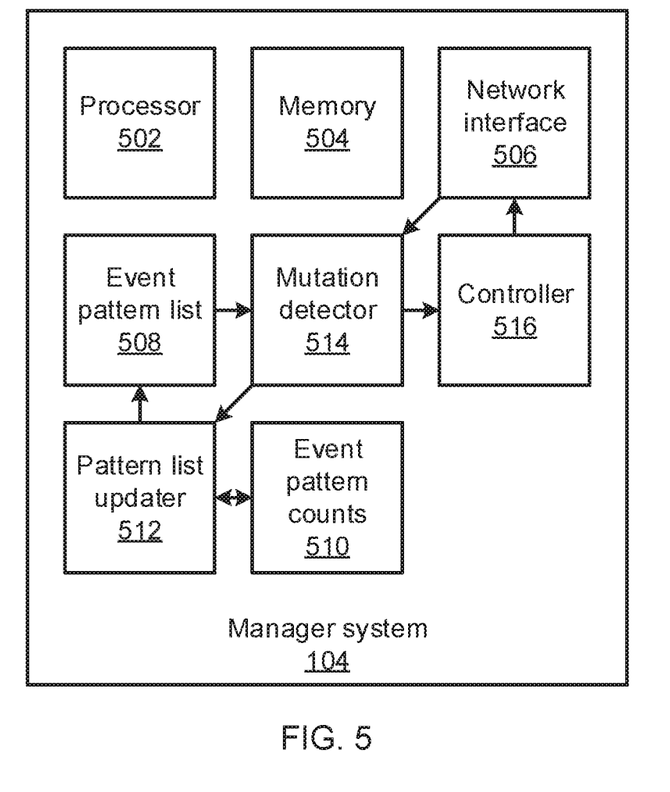
FIG. 5 is a block diagram of a manager system configured to detect and correct unintended change events in accordance with an embodiment of the present invention.

Referring now to FIG. 5, additional detail on the manager system is shown. The manager system 104 includes a hardware processor 502 and a memory 504. A network interface communications with the processing nodes 106 by any appropriate wired or wireless communications medium and protocol. Although it is specifically contemplated that the manager system 104 can be a distinct piece of hardware, in some embodiments the manager system 104 can be collocated with one of the processing nodes 106.

A mutation detector 514 receives information regarding change events detected in the processing nodes 106 via the network interface 506. This information includes pattern counts of any matched events as well as raw event information for unmatched events. The mutation detector 514 provides this information to a pattern list updater 512, which updates the pattern counts 510 by adding any newly received counts and which updates the event pattern list 508 with any newly recognized events.

The mutation detector 514 identifies unintended changes to one or more containers 208. A controller 516 uses this information to perform a corrective action using the network interface 506. In some embodiments, the controller 516 can issue an alert to an administrator. In some embodiments, the controller 516 can issue commands to the containers 208 and/or processing nodes 106 where unintended changes have been detected to mitigate or correct the effect of the change.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
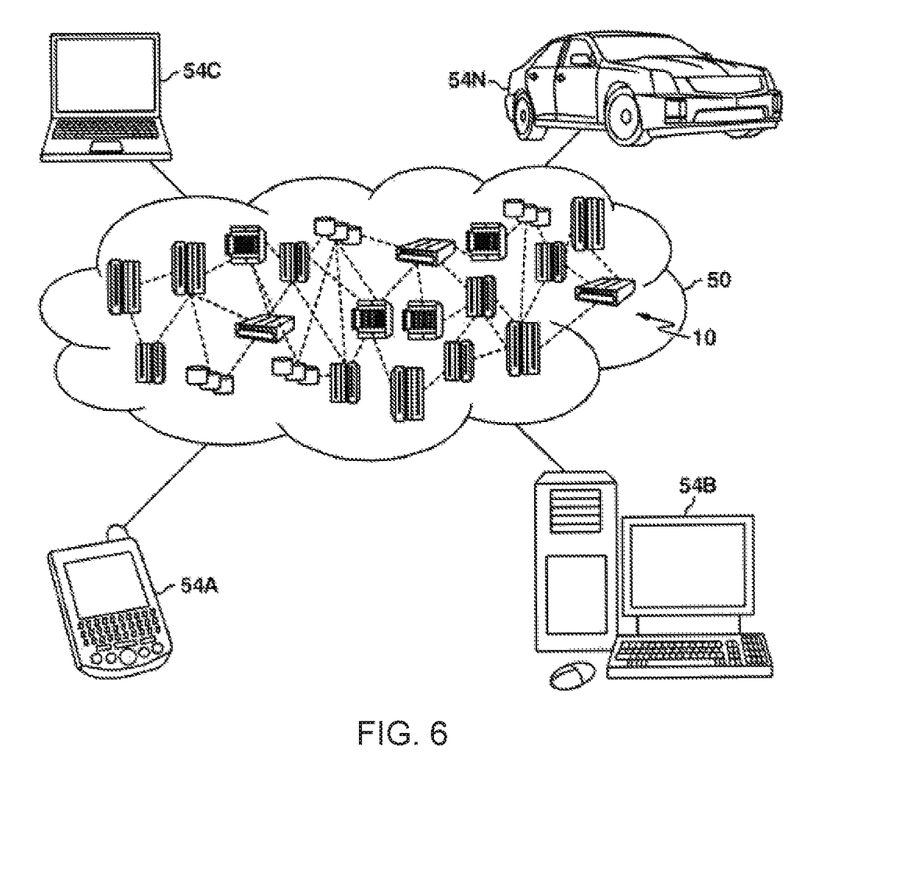
FIG. 6 is a block diagram showing an illustrative cloud computing environment having one or more cloud computing nodes with which local computing devices used by cloud consumers communicate in accordance with one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
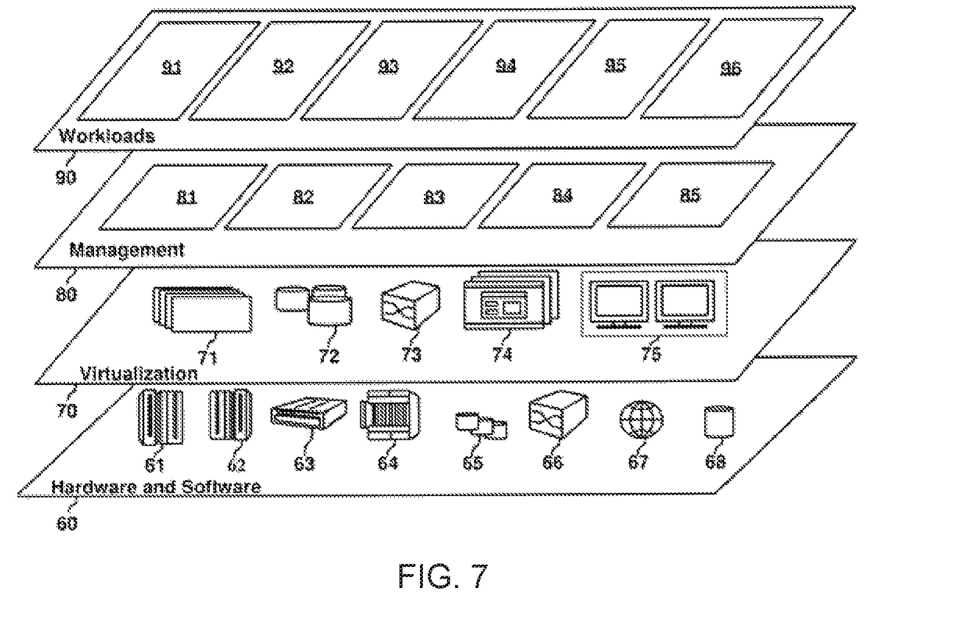
FIG. 7 is a block diagram showing a set of functional abstraction layers provided by a cloud computing environment in accordance with one embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 174; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tracking cluster image mutation events 96.

Having described preferred embodiments of tracking cluster image mutation events (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting mutation events, comprising:
   receiving event information from one or more processing nodes for events that do not match a change event pattern;
   generating a new event pattern based on the received event information;
   transmitting the new event pattern to the one or more processing nodes;
   collecting change event pattern counts from the one or more processing nodes;
   identifying unintended change events based on the collected change event pattern counts; and
   performing a corrective action for the unintended change events.

2. The method of claim 1, wherein collecting change pattern counts comprises summing counts for respective change event patterns from a plurality of processing nodes.

3. The method of claim 1, wherein identifying unintended change events comprises comparing the collected change event pattern counts to a threshold.

4. The method of claim 3, wherein identifying unintended change events comprises determining that below-threshold change event pattern counts represent unintended change events.

5. The method of claim 1, wherein the new event pattern includes a tuple of a key, an operator, and a value, to match the received event information.

6. The method of claim 5, further comprising determining that the new event pattern matches an above-threshold number of events and changing the tuple to match fewer events.

7. The method of claim 1, wherein performing the corrective action comprises performing an action selected from the group consisting of notifying an administrator regarding the unintended change events, reversing or correcting the change, changing a status of a processing node or a container on a processing node to limit external access to its operations, and stopping and reinitializing a container on a processing node.

8. A non-transitory computer readable storage medium comprising a computer readable program for detecting mutation events, wherein the computer readable program when executed on a computer causes the computer to perform the steps of:
   receiving event information from one or more processing nodes for events that do not match a change event pattern;
   generating a new event pattern based on the received event information;
   transmitting the new event pattern to the one or more processing nodes;
   collecting change event pattern counts from the one or more processing nodes;
   identifying unintended change events based on the collected change event pattern counts; and
   performing a corrective action for the unintended change events.

9. A system for detecting mutation events, comprising:
   a pattern list updater configured to receive event information from one or more processing nodes for events that do not match a change event pattern, to generate a new event pattern based on the received event information, and to transmit the new event pattern to the one or more processing nodes;
   a mutation detector configured to collect change event pattern counts from the one or more processing nodes and to identify unintended change events based on the collected change event pattern counts; and
   a controller configured to perform a corrective action for the unintended change events.

10. The system of claim 9, wherein the mutation detector is further configured to sum counts for respective change event patterns from a plurality of processing nodes.

11. The system of claim 9, wherein the mutation detector is further configured to compare the collected change event pattern counts to a threshold.

12. The system of claim 11, wherein the mutation detector is further configured to determine that below-threshold change event pattern counts represent unintended change events.

13. The system of claim 9, wherein the new event pattern includes a tuple of a key, an operator, and a value, to match the received event information.

14. The system of claim 9, wherein the corrective action is selected from the group consisting of notifying an administrator regarding the unintended change events, reversing or correcting the change, changing a status of a processing node or a container on a processing node to limit external access to its operations, and stopping and reinitializing a container on a processing node.

\* \* \* \* \*